(12) United States Patent
Ohara et al.

(10) Patent No.: US 6,329,093 B1
(45) Date of Patent: Dec. 11, 2001

(54) POLYMER ELECTROLYTE FUEL CELL STACK

(75) Inventors: Hideo Ohara, Kadoma; Hisaaki Gyoten, Shijonawate; Kazuhito Hatoh, Daito; Kazufumi Nishida, Moriguchi; Makoto Uchida, Hirakata; Eiichi Yasumoto, Katano; Yasushi Sugawara, Neyagawa; Teruhisa Kanbara, Ikeda; Toshihiro Matsumoto, Ibaraki, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/377,651

(22) Filed: Aug. 19, 1999

(30) Foreign Application Priority Data

Aug. 20, 1998 (JP) .................................. 10-234510
Aug. 20, 1998 (JP) .................................. 10-234522
Aug. 20, 1998 (JP) .................................. 10-234761

(51) Int. Cl.[7] .............................. H01M 8/04; H01M 8/10; H01M 8/24
(52) U.S. Cl. ................................ 429/32; 429/35; 429/37; 429/39
(58) Field of Search .................. 429/32, 35, 37, 429/38, 39

(56) References Cited

U.S. PATENT DOCUMENTS

| 3,320,092 | * | 5/1967 | Uline . | |
|---|---|---|---|---|
| 5,053,291 | * | 10/1991 | Hirota | 429/39 |
| 5,419,980 | * | 5/1995 | Okamoto et al. | 429/32 |
| 5,514,487 | | 5/1996 | Washington et al. | 429/39 |
| 5,573,867 | * | 11/1996 | Zafred et al. | 429/34 X |
| 5,942,350 | * | 8/1999 | Roy et al. | 429/38 |
| 6,048,635 | * | 4/2000 | Guthrie | 429/38 X |

FOREIGN PATENT DOCUMENTS

| 58 164156 A | 9/1983 | (JP) . |
|---|---|---|
| 59 098473A | 6/1984 | (JP) . |
| 01 019675 A | 1/1989 | (JP) . |
| 01 279575 A | 11/1989 | (JP) . |
| 04 355061 A | 12/1992 | (JP) . |

* cited by examiner

*Primary Examiner*—Stephen Kalafut
(74) *Attorney, Agent, or Firm*—Akin, Gump, Strauss, Hauer & Feld, L.L.P.

(57) ABSTRACT

The present invention provides a polymer electrolyte fuel cell stack that includes an inlet manifold that distributes supplies of the gaseous fuel, the oxidant gas, and cooling water in a sequence of lamination from a unit cell on one end of the cell laminate to a unit cell on the other end of the cell laminate and an outlet manifold that discharges exhausts of the gaseous fuel, the oxidant gas, and the cooling water in an inverted sequence of lamination from the unit cell on the other end of the cell laminate to the unit cell on the one end of the cell laminate. This configuration actualizes a small-sized, compact fuel cell stack.

8 Claims, 15 Drawing Sheets

F I G. 1 2
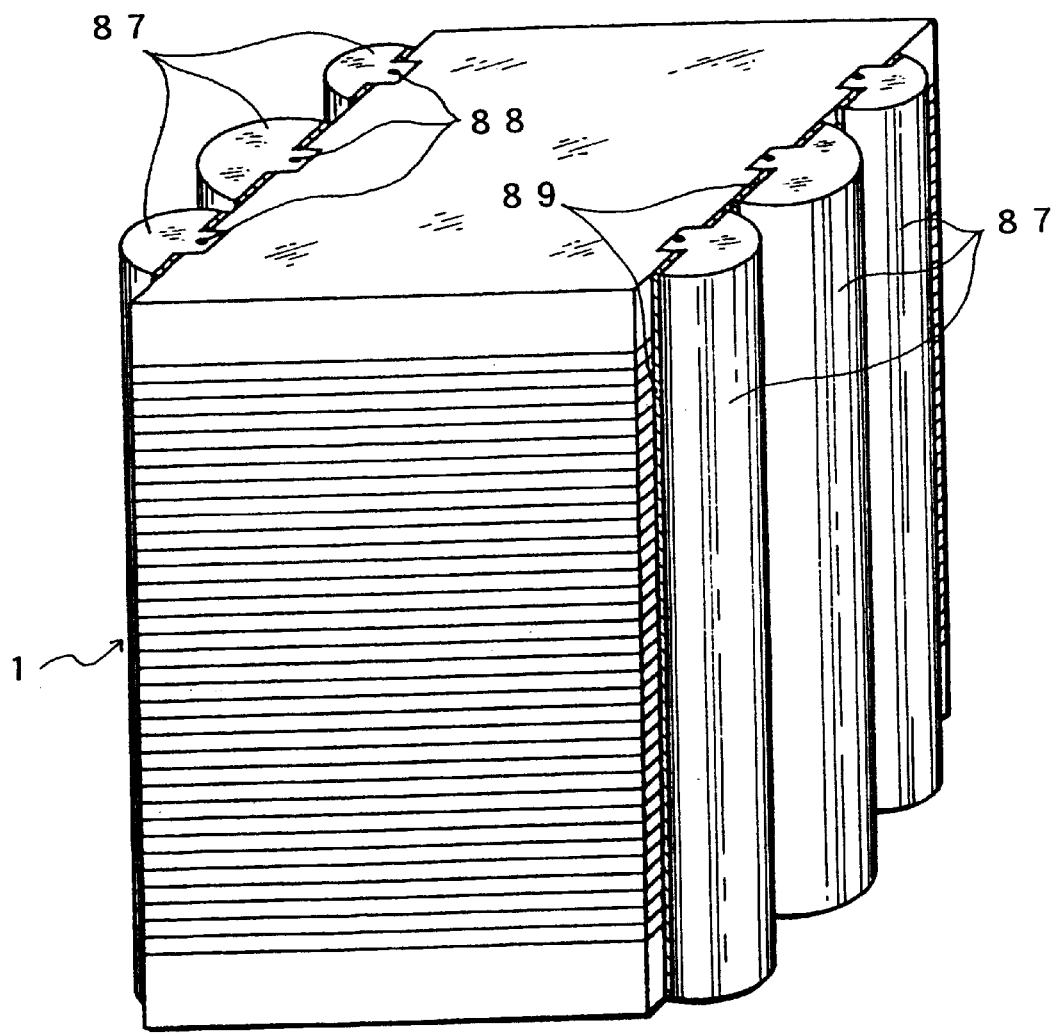

POLYMER ELECTROLYTE FUEL CELL STACK

BACKGROUND OF THE INVENTION

The present invention relates to a polymer electrolyte fuel cell stack and is used for portable power sources, electric vehicle power sources, and domestic cogeneration systems.

The polymer electrolyte fuel cell causes a gaseous fuel, such as gaseous hydrogen, and an oxidant gas, such as the air, to be subjected to electrochemical reactions at gas diffusion electrodes, thereby generating the electricity and the heat simultaneously.

One example of the polymer electrolyte fuel cell stack is described below with reference to FIG. 10.

A pair of catalytic reaction layers 62, which are mainly composed of carbon powder with a platinum metal catalyst carried thereon, are closely attached to opposite faces of a polymer electrolyte membrane 63, which selectively transports hydrogen ions. A pair of diffusion layers 61 having both the gas permeability and the electron conductivity are further arranged on the respective outer faces of the catalytic reaction layers 62. The catalytic reaction layer 62 and the diffusion layer 61 constitute each electrode 69. The electrodes 69 and the polymer electrolyte membrane 63 are integrally formed to construct a membrane electrode assembly (hereinafter referred to as MEA) 70. Gas sealing members and gaskets are disposed around the electrodes 69 across the polymer electrolyte membrane 63, in order to prevent supplies of gaseous fuel and oxidant gas from leaking outside the fuel cell stack or from being mixed with each other. These gas sealing members and gaskets may be integrated with the MEA 70 in advance.

Referring to FIG. 15, in the fuel cell stack having the above configuration, one sealing technique arranges sealing members 127 and O rings 128 around the electrodes 69 across the polymer electrolyte membrane 63, in order to prevent the gaseous hydrogen and the air from leaking outside the fuel cell stack or from being mixed with each other. Another sealing technique arranges gaskets 129, which are composed of an appropriate resin or metal and have substantially identical thickness with that of the electrode 69, around the electrodes 69 as shown in FIG. 16. In this structure, the clearance between a separate plate 64 and the gasket 129 is sealed with an adhesive or grease.

Another recently proposed technique shown in FIG. 17 causes specific parts of the MEA 70 that require the gas sealing property, to be impregnated previously with a resin 131, which has sealing effect and subsequently solidifies. The solidified resin 131 ensures the gas sealing property between the MEA 70 and the separator plate.

A pair of conductive separator plates 64 are arranged across the MEA 70 so as to mechanically fix the MEA 70 and cause the MEA 70 to electrically connect with the adjoining MEAs 70 in series. A specific part of the separator plate 64 that is in contact with the MEA 70 has a gas flow path 65, which feeds the supply of the gaseous fuel or the oxidant gas to the surface of the electrode 69 and flows out the gas evolved by the reaction and the remaining excess gas. The gas flow path 65 may be formed independently of the separator plate 64. As shown in FIG. 10 and FIGS. 15 through 17, however, a groove formed on the surface of the separator plate 64 generally constitutes the gas flow path 65.

Most of the fuel cell stacks have a laminate structure in which a large number of unit cells are laid one upon another. A cooling plate is provided for every one or two unit cells, in order to cause the heat produced with the electric power in the course of operation of the fuel cell stack to be out of the fuel cell stack. The cooling plate is generally a thin metal plate which a heat medium, such as cooling water, flows through. This structure makes the cell temperature kept at a substantially fixed level and enables the generated thermal energy to be unitized, for example, in the form of warm water.

Another possible application makes the separator plate 64 itself function as the cooling plate. In this case, a cooling water flow path is formed on the rear face of the separator plate 64, which is included in each unit cell, to make a flow of cooling water. In this structure, O rings and gaskets are also required to seal the heat medium, such as cooling water. The O rings in the seal should be smashed completely to ensure the sufficient electric conductivity across the cooling plate.

Such a cell laminate typically requires supply inlets and exhaust outlets of the gaseous fuel and the cooling water to and from the respective unit cells, which are respectively joined to manifolds. Various arrangements and layouts of these manifolds are classified into two groups, that is, an internal manifold type and an external manifold type.

The general arrangement is the internal manifold type, in which the supply inlets and the exhaust outlets of the gaseous fuel and the cooling water are disposed inside the cell laminate. In the case where the reformed city gas is used as the gaseous fuel to drive the cells, however, the CO concentration rises in the downstream area of the flow path of the gaseous fuel. This may cause the electrode to be poisoned with CO, which results in lowering the temperature and thereby further accelerating the poisoning of the electrode. In order to relieve the deterioration of the cell performance, the external manifold type is noted as the structure that increases the length of the gas supply and exhaust unit between the manifold and each unit cell.

In either of the internal manifold type and the external manifold type, the required process lays a plurality of unit cells including the cooling units one upon another in one direction to provide a cell laminate, arranges a pair of end plates outside the cell laminate, and fixes the space between the pair of end plates with fastening rods. It is naturally desirable to urge the whole face of each unit cell as uniformly as possible. In other words, it is desirable that the substantially uniform compressive force is applied to the whole laminating faces of the cell laminate. From the viewpoint of the mechanical strength, the end plates and the tie rods are generally made of a metal material, such as stainless steel. These end plates and fastening rods are electrically insulated from the cell laminate by insulator plates, so that the electric current does not run outside through the end plates. One proposed technique for fastening a cell laminate makes the fastening rods pierce the through holes formed in the separator plates. Another proposed technique binds the whole cell laminate on its periphery in the laminating direction with metal belts.

In any of the sealing methods shown in FIGS. 15, 16, and 17, the constant compressive force is required to maintain the sufficient sealing property and ensure the small contact resistance between the electrodes and the separator plates and between the separate plates. One adopted structure inserts a coiled spring or a belleville or disc spring between the fastening rod and the end plate. The compressive force ensures the electric contact between the respective constituents of the cells including the separator plates, the electrodes, and the electrolyte membranes.

For the stable performance of the cell laminate, it is required to supply the gaseous fuel, the oxidant gas, and the cooling water evenly to the respective unit cells. The general structure adopted for that purpose increases the cross section of the manifold, which the supplies of the respective fluids flow through. The large cross section decreases the flow rate of each fluid in the manifold and reduces the effects of the pressure gradient due to the dynamic pressure of the fluid. In order to reduce the whole size and weight of the fuel cell stack, on the other hand, it is required to minimize the cross section of the manifold.

In the conventional configuration, the electricity produced in the cell laminate is collected by a pair of current collectors and output to external equipment connected to the respective terminals of the current collectors. In the case of the current collectors each having a specific extension protruded from the contour of the cell laminate, the specific extensions of the current collectors are connected to the external equipment. This means that the site of electrical contact is outside the contour of the cell laminate. This undesirably makes the whole fuel cell stack bulky and lowers the degree of freedom when the fuel cell stack is mounted on equipment.

The object of the present invention is thus to solve the above problems and to provide a polymer electrolyte fuel cell stack that is small in size and light in weight and has a high degree of freedom when the fuel cell stack is mounted on a variety of equipment.

SUMMARY OF THE INVENTION

The present invention provides a polymer electrolyte fuel cell stack that includes a cell laminate, which has a plurality of unit cells that are laid one upon another via conductive separators. Each of the unit cells includes a polymer electrolyte membrane, a pair of electrodes that are arranged across the polymer electrolyte membrane and respectively have a catalytic reaction layer, and a unit for feeding a supply of gaseous fuel containing gaseous hydrogen to one of the electrodes and for feeding a supply of oxidant gas containing oxygen to the other of the electrodes. The polymer electrolyte fuel cell stack further includes: an inlet manifold that distributes supplies of the gaseous fuel, the oxidant gas, and cooling water in a sequence of lamination from a unit cell on one end of the cell laminate to a unit cell on the other end of the cell laminate; and an outlet manifold that discharges exhausts of the gaseous fuel, the oxidant gas, and the cooling water in an inverted sequence of lamination from the unit cell on the other end of the cell laminate to the unit cell on the one end of the cell laminate.

In accordance with one preferable application, the polymer electrolyte fuel cell stack further includes: a pair of end plates that are disposed on opposite sides of the cell laminate to apply a compressive force to the respective unit cells of the cell laminate in a laminating direction; a pair of current collectors that collect electricity (current) the respective unit cells, each of the current collectors having a specific part that pierces the end plate; and a pair of insulating members, each of the insulating members being interposed between the current collector and the end plate.

It is also preferable that the inlet manifold and the outlet manifold are respectively arranged on opposite side faces of the cell laminate and in parallel to a laminating direction of the respective unit cells.

In accordance with one effective arrangement, the inlet manifold has a cross section gradually decreasing towards a downstream thereof, and the outlet manifold has a cross section gradually increasing towards a downstream thereof.

In accordance with another preferable application, the inlet manifold and the outlet manifold are arranged around a periphery of the cell laminate, so as to bind or fasten the respective unit cells and reduce a contact resistance between adjoining unit cells.

In accordance with another effective arrangement, flow paths of the gaseous fuel, the oxidant gas, and the cooling water are disposed in each of the end plates in a direction perpendicular to a laminating direction of the respective unit cells.

The present invention is also directed to a polymer electrolyte fuel cell stack that includes a plurality of the cell laminates discussed above, and a plurality of end plates that are arranged in such a manner that each of the cell laminates is interposed between a pair of end plates. Flow paths of the gaseous fuel, the oxidant gas, and cooling water formed in the plurality of end plates are respectively connected or linked via a fluid sealing mechanism.

The present invention is further directed to a polymer electrolyte fuel cell stack that includes a plurality of the cell laminates discussed above, wherein the cell laminates are connected with each other via a chamber having a plurality of flow paths through which supplies of the gaseous fuel, the oxidant gas, and the cooling water are fed to each of the cell laminates.

The present invention also provides a method of installing a polymer electrolyte fuel cell stack that includes a cell laminate, which has a plurality of unit cells that are laid one upon another via conductive separators. Each of the unit cells includes a polymer electrolyte membrane, a pair of electrodes that are arranged across the polymer electrolyte membrane and respectively have a catalytic reaction layer, and a unit for feeding a supply of gaseous fuel containing gaseous hydrogen to one of the electrodes and for feeding a supply of oxidant gas containing oxygen to the other of the electrodes. The polymer electrolyte fuel cell stack is disposed in such a manner that a center of gravity of the fuel cell stack is closest to a mounting surface. The mounting surface means a surface on which the fuel cell stack is mounted.

BRIEF DESCRIPTION OF SEVERAL VIEW OF DRAWINGS

FIG. 12 is a perspective view schematically illustrating a fuel cell stack of the present Invention In Example 3;

DETAILED DESCRIPTION OF THE INVENTION

The present invention provides a polymer electrolyte fuel cell stack that includes a cell laminate, which has a plurality of unit cells that are laid one upon another via conductive separators. Each of the unit cells includes a polymer electrolyte membrane, a pair of electrodes that are arranged across the polymer electrolyte membrane and respectively have a catalytic reaction layer, and a unit for feeding a supply of gaseous fuel containing gaseous hydrogen to one of the electrodes and for feeding a supply of oxidant gas containing oxygen to the other of the electrodes. The polymer electrolyte fuel cell stack further includes: an inlet manifold that distributes supplies of the gaseous fuel, the oxidant gas, and cooling water in a sequence of lamination from a unit cell on one end of the cell laminate to a unit cell on the other end of the cell laminate; and an outlet manifold that discharges exhausts of the gaseous fuel, the oxidant gas, and the cooling water in an inverted sequence of lamination from the unit cell on the other end of the cell laminate to the unit cell on the one end of the cell laminate.

The fuel cell stack of the present invention may have either an external manifold arrangement or an internal manifold arrangement.

Figure 1:
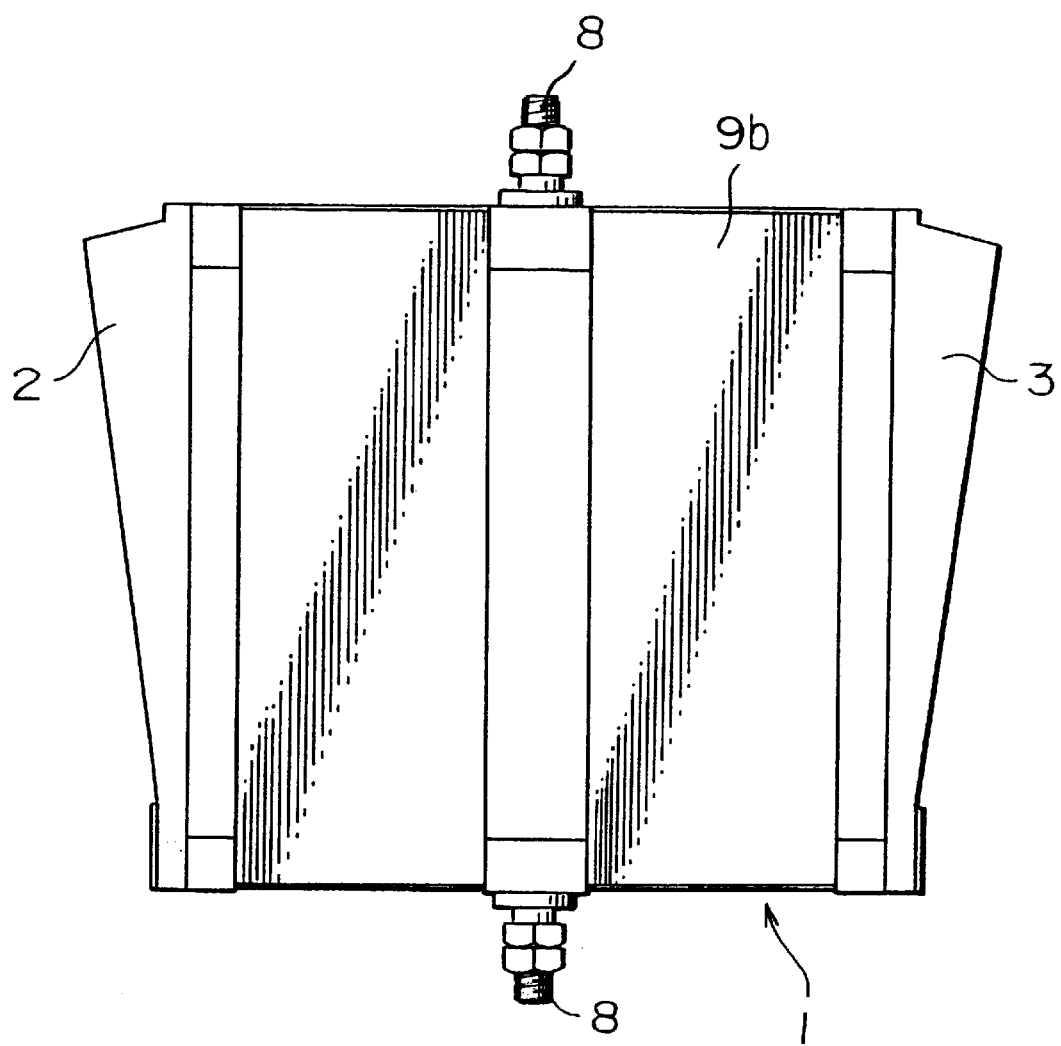
FIG. 1 is a front view schematically illustrating a fuel cell stack in one embodiment of the present invention.

The following describes the fuel cell stack of the present invention having the external manifold arrangement with reference to the drawing. FIG. 1 is a front view schematically illustrating a fuel cell stack in one embodiment of the present invention. The fuel cell stack shown in FIG. 1 includes a cell laminate 1 and an inlet manifold 2, which is arranged on one side face of the cell laminate 1 to distribute supplies of a gaseous fuel, an oxidant gas, and cooling water in a laminating direction. The inlet manifold 2 enables the supplies of the gaseous fuel, the oxidant gas, and the cooling water to be distributed and fed from one side face of the cell laminate 1 in the sequence of lamination from a unit cell on one end of the cell laminate 1 to another unit cell on the other end of the cell laminate 1.

The fuel cell stack shown in FIG. 1 also has an outlet manifold 3, which is arranged on the other side face of the cell laminate 1 to discharge exhausts of the gaseous fuel, the oxidant gas, and the cooling water. The outlet manifold 3 enables the exhausts of the gaseous fuel, the oxidant gas, and the cooling water to be discharged from the other side face of the cell laminate 1 (opposite to the side face with the inlet manifold 2). The exhausts of the gaseous fuel, the oxidant gas, and the cooling water collected from all the unit cells included in the cell laminate 1 are discharged through the outlet manifold 3.

As clearly shown in FIG. 1, it is preferable that the inlet manifold 2 has the cross section gradually decreasing towards the downstream of the flows of the gaseous fuel, the oxidant gas, and the cooling water and that the outlet manifold 3 has the cross section gradually increasing towards the downstream. This arrangement is advantageous in that the gaseous fuel, each of the oxidant gas, and the cooling water can be distributed to each unit cell in the cell laminate uniformly. For the purpose of the reference, a top view schematically illustrating the fuel cell stack shown in FIG. 1 is shown in FIG. 2.

Figure 2:
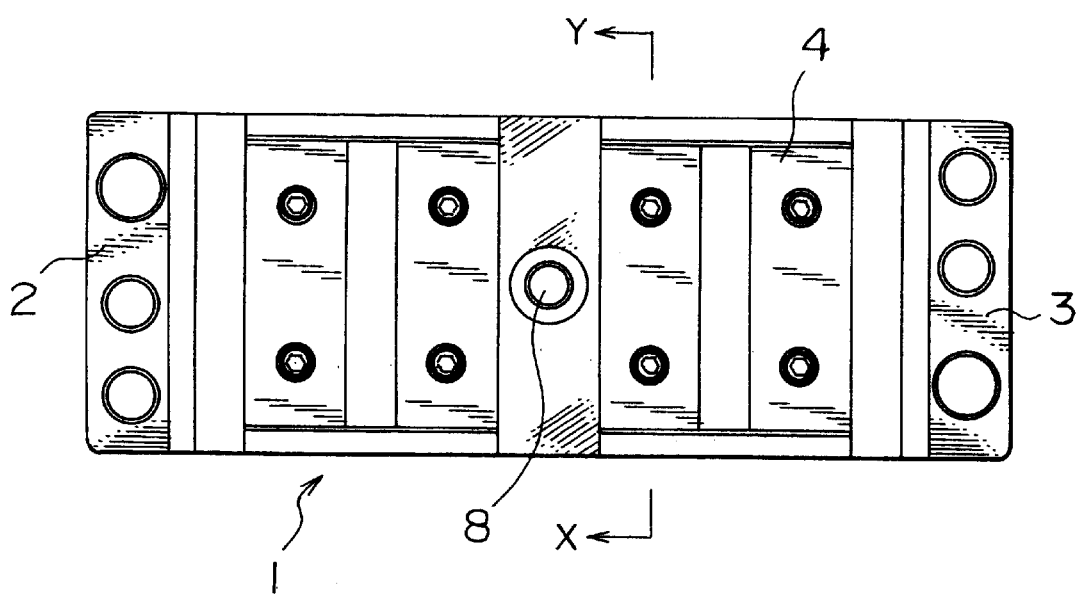
FIG. 2 is a top view schematically illustrating the fuel cell stack shown in FIG. 1.
Figure 3:
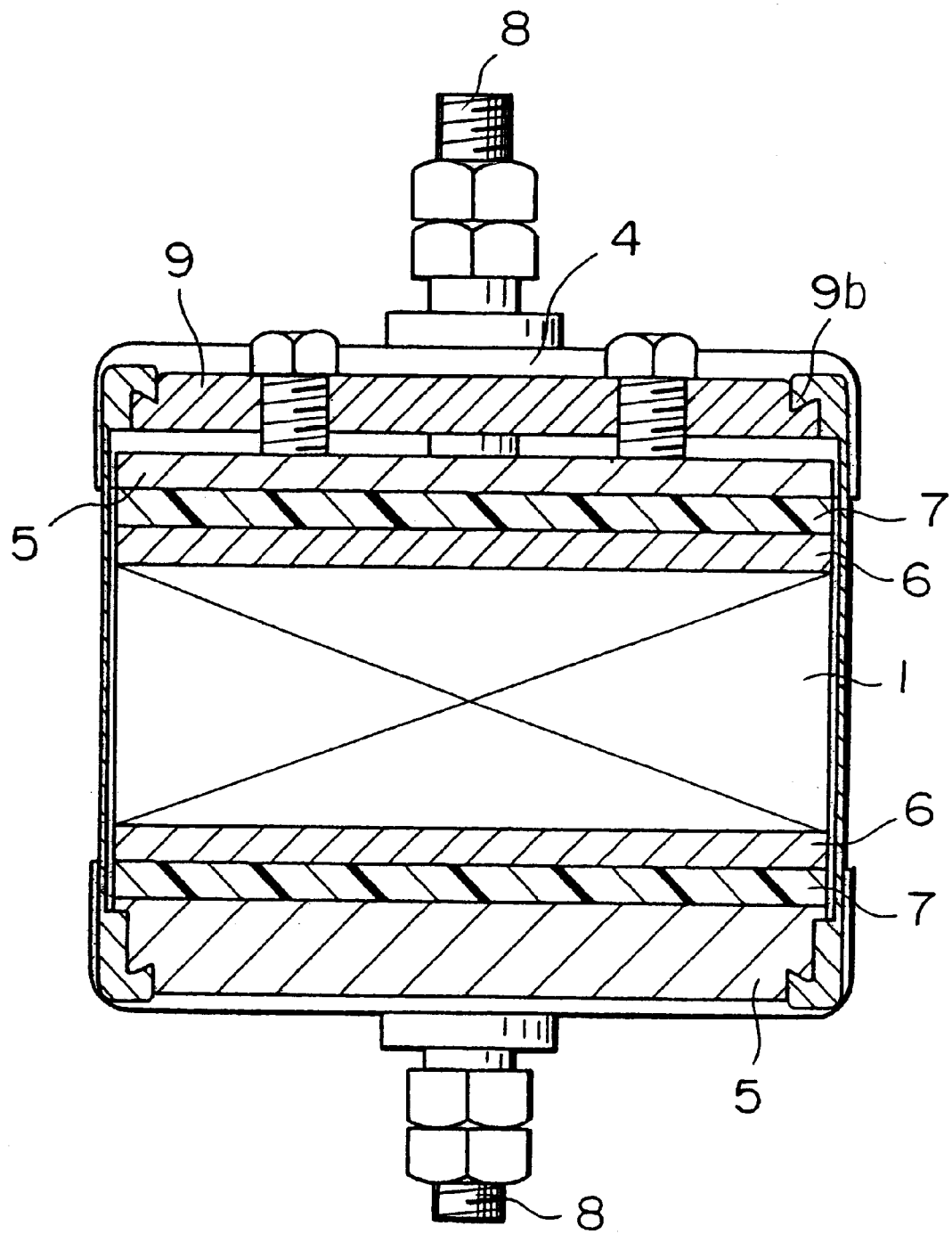
FIG. 3 is a sectional view illustrating the fuel cell stack, taken on the line X-Y of FIG. 2.

FIG. 3 is a sectional view schematically illustrating the fuel cell stack, taken on the line X-Y of FIG. 2. As shown in FIG. 3, the fuel cell stack of the present invention has a pair of end plates 5 that are disposed on opposite sides of the cell laminate 1 to apply the compressive force to the respective unit cells of the cell laminate 1 in the laminating direction. A pair of current collectors 6 collect the electricity of the respective unit cells, and respectively have a specific part that pierces the corresponding end plate 5. In a preferable structure, an insulating member 7 is interposed between the current collector 6 and the end plate 5. Referring to FIG. 3, for example, a pair of collecting members 8 extend from the respective current collectors 6 in the laminating direction of the cell laminate 1. Each of the collecting members 8 passes through the end plate 5 via the insulating member 7.

This arrangement of collecting the electricity through the extended collecting members 8 enables the fuel cell stack of the present invention to be electrically connected to external equipment within the contour of the cell laminate 1. The arrangement of the present invention thus advantageously reduces the size of the whole fuel cell stack and improves the degree of freedom when the fuel cell stack is mounted on a variety of equipment.

As shown in FIG. 3, a metal plate 4 is disposed above an upper side of the cell laminate 1. The metal plate 4, in cooperation with the inlet manifold 2 and the outlet manifold 3, functions to prevent the strain or torsion of the cell laminate 1.

Further referring to FIG. 3, an auxiliary plate 9, such as a leaf spring, is disposed on the upper end plate 5. When male screws are bolted through the metal plate 4, the auxiliary plate 9 and fastening belts 9b fasten the respective unit cells. included in the cell laminate 1. As the auxiliary plate 9, so-called plate spring may be employed.

In order to reduce the pressure gradient due to the dynamic pressure of the fluid, the fuel cell stack of the present invention preferably does not adopt the conventional uniform fluid distribution technique that increases the cross section of each manifold. In the fuel cell stack of the present invention, supplies of the respective fluids (gaseous fuel, oxidant gas, and cooling water) are fed to the inlet manifold 2, which is disposed on one side face of the cell laminate 1 in the laminating direction. The respective fluids are flown into the cell laminate 1 from a specific unit cell, which is located on one end of the cell laminate 1 in the laminating direction, pass through the respective unit cells, and are discharged from the outlet manifold 3, which is disposed on the opposite side face of the cell laminate 1 in the laminating direction. Namely the fuel cell stack of the present invention preferably adopts a novel uniform fluid distribution technique, in which the flow-in direction and the flow-out direction are arranged on the opposite side faces of the cell laminate 1. It is accordingly preferable that the inlet manifold and the outlet manifold are arranged on the opposite side faces of the cell laminate and in parallel to the laminating direction of the respective unit cells.

In the fuel cell stack of the present invention, supplies the respective fluids, that is, the gaseous fuel, the oxidant gas, and the cooling water, required for driving the cell laminate, which is obtained by laying a plurality of unit cells one upon another, are flown into the cell laminate from one end of the cell laminate in the laminating direction. Exhausts of the respective fluids passing through thee respective unit cells are then flown out of the cell laminate in the direction opposite to the flow-in direction.

This arrangement ensures the variable flow length of each fluid passing through each unit cell. Balancing the pressure gradient occurring in each fluid due to the dynamic pressure with the pressure loss occurring in each fluid due to the variation in flow length enables each fluid to be uniformly supplied to each unit cell. The pressure gradient due to the dynamic pressure may be regulated by decreasing the cross section of the manifold. This advantageously gives a size-reduced, light weighted fuel cell stack. Another advantage of this arrangement is to release the heat evolved in the course of the electrochemical reactions of the unit cells.

Figure 4:
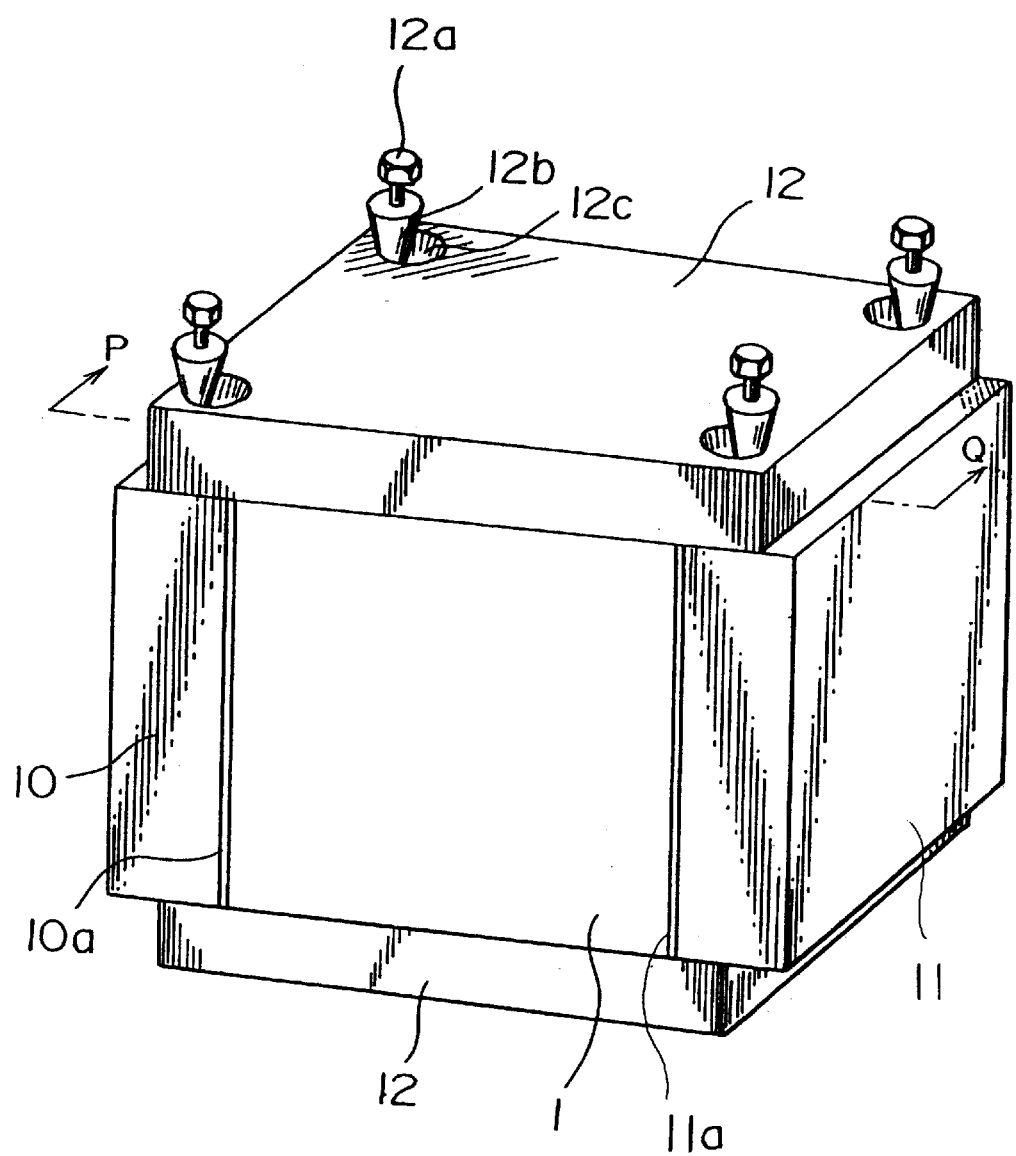
FIG. 4 is a perspective view illustrating another fuel cell stack in another embodiment of the present invention.

In another embodiment of the present invention, the manifolds may be arranged around the periphery of the cell laminate 1, in place of on the side faces of the cell laminate 1, as shown in FIG. 4. In this structure, a connection member 12 is added to connect or link an inlet manifold 10 with an outlet manifold 11. This arrangement securely fastens the respective unit cells and reduces the contact resistance between the adjoining unit cells, and also decreases a number of members constituting a fuel cell of the present invention. FIG. 4 is a perspective view schematically illustrating a fuel cell stack of this arrangement in another embodiment of the present invention.

Figure 5:
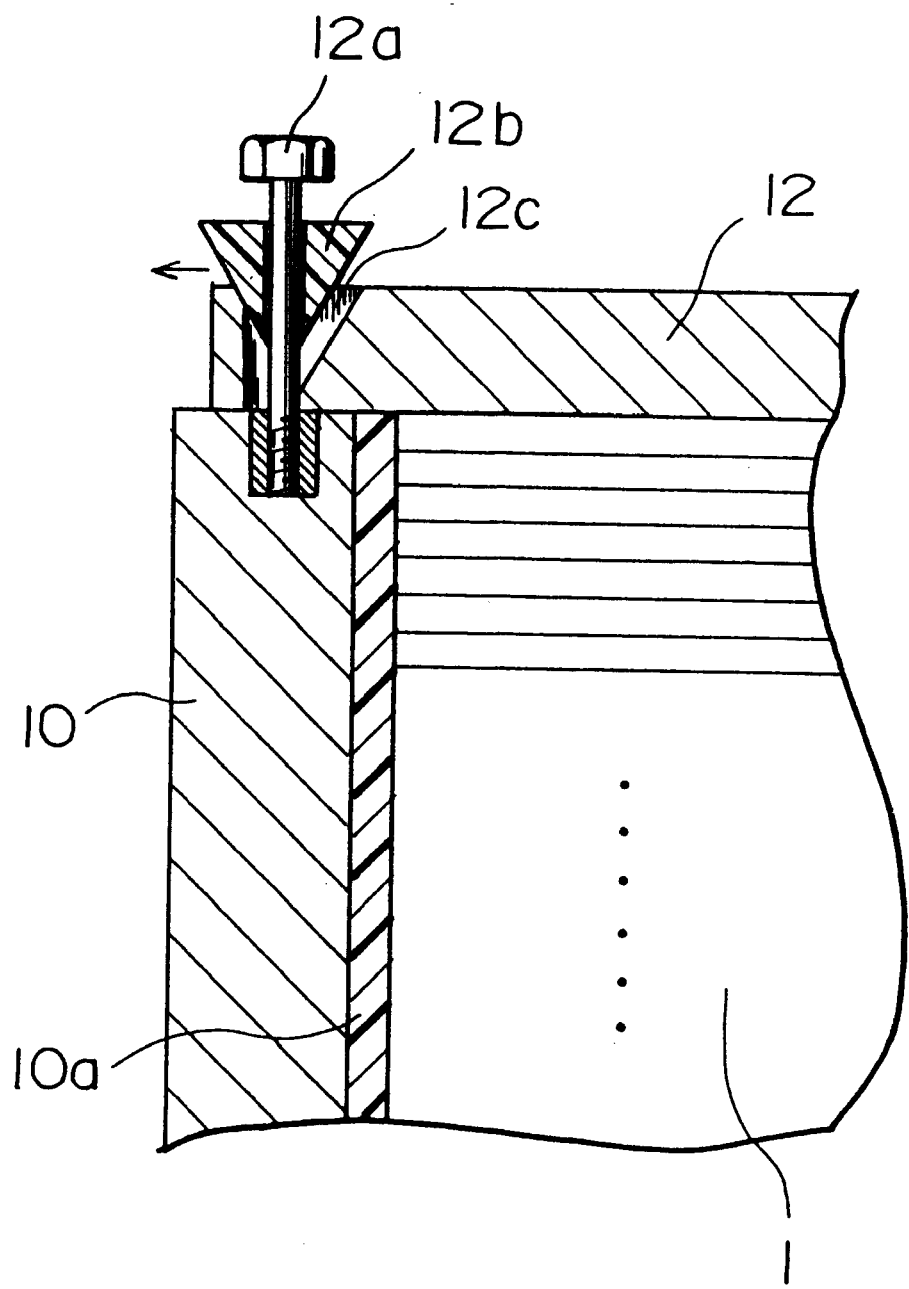
FIG. 5 is a sectional view illustrating the fuel cell stack, taken on the line P-Q of FIG. 4.

FIG. 5 is a sectional view illustrating the fuel cell stack, taken on the line P-Q of FIG. 4. As shown in FIG. 4 and FIG. 5, through hole 12c is provided with the connection member 12. The through hole 12c may has a shape of an inverted and distorted funeral for example, and a bolt 12a is inserted into the through hole 12c via a collar 12b having a space in the center thereof. Treaded holes are provided with the inlet manifold 10 and the outlet manifold 11 and therefore, when the bolt 12a is screwed into the threaded hole, a force represented by the arrow in FIG. 5 is applied onto the connection member 12 by the hollow collar 12b. As the result, the cell laminate 1 is tightly fastened by the inlet manifold 10, the outlet manifold 11, and the connection member 12. It is noted that numerals 10a and 11a show sealing members. In addition, the bolt 12a and the hollow collar 12b under the cell laminate 1 are omitted in FIG. 4.

It is preferable that the inlet manifold and the outlet manifold are made of an elastic material. The elastic material advantageously absorbs the creep of the thickness of the cell laminate in the laminating direction and the unevenness of the side faces of the cell laminate that are in contact with the sealing faces of the external manifolds, thereby improving the reliability of the seals in the external manifolds.

In the fuel cell stack of the present invention, it is further preferable that the gas sealing faces of the inlet manifold and the outlet manifold form flanges, which are fitted in ring frame bodies, and that the seals of the respective manifolds are attained by fastening the ring frame bodies in the laminating direction.

In the fuel cell stack of the present invention, the respective ends of the electrodes included in each unit cell reach the side surfaces of the cell laminate. It is accordingly preferable to cover the side faces of the cell laminate with a gas-tight, non-conductive material, so as to give the gas sealing properties to the electrodes and the separators. It is also preferable that the manifolds are made of the gas-tight, non-conductive material. The sealing faces of the external manifolds and the side faces of the cell laminate that are in contact with the sealing faces are composed of the identical material having an identical thermal expansion coefficient. This arrangement ensures the secure joint of the external manifolds with the cell laminate and improves the reliability of the seals in the external manifolds.

The known ultrasonic welding technique is preferably applied to join the manifolds with the gas-tight, non-conductive material. This technique enables the sealing faces of the external manifolds to be securely joined with the corresponding faces of the cell laminate and improves the reliability of the seals in the external manifolds.

The gas-tight, non-conductive material may be formed by injection molding. This enables the gas-tight, non-conductive material to be accurately fitted to the side faces of the cell laminate, thereby ensuring the improved reliability of the seals in the external manifolds.

It is especially preferable that the manifolds and the gas-tight, non-conductive material arranged on the side faces of the cell laminate are integrally formed, for example, by injection molding. This arrangement is free of the joints between the external manifolds and the side faces of the cell laminate, thereby further improving the reliability of the seals in the external manifolds.

The gas-tight, non-conductive material may be resin or rubber to ensure the insulation. Especially application of the rubber absorbs the creep of the thickness of the cell laminate in the laminating direction and the unevenness of the side faces of the cell laminate that are in contact with the sealing faces of the external manifolds, thereby improving the reliability of the seals in the external manifolds.

The end plates disposed on the opposite faces of the cell laminate are described more in detail.

In one preferable arrangement of the fuel cell stack of the present invention, flow paths of the gaseous fuel, the oxidant gas, and the cooling water required to be fed to the cell laminate are arranged in each end plate in the direction perpendicular to the fastening direction of the cell laminate. The arrangement of fastening the cell laminate with the end plates in such a manner enables a plurality of the cell laminates having an identical configuration to be joined sequentially to a fuel cell stack. This arrangement also enables the fuel cell stack to be readily mounted on a variety of equipment. The identical configuration of the cell laminates effectively reduces the required cost.

The following describes the end plates of the present invention with reference to the drawings.

Figure 6:
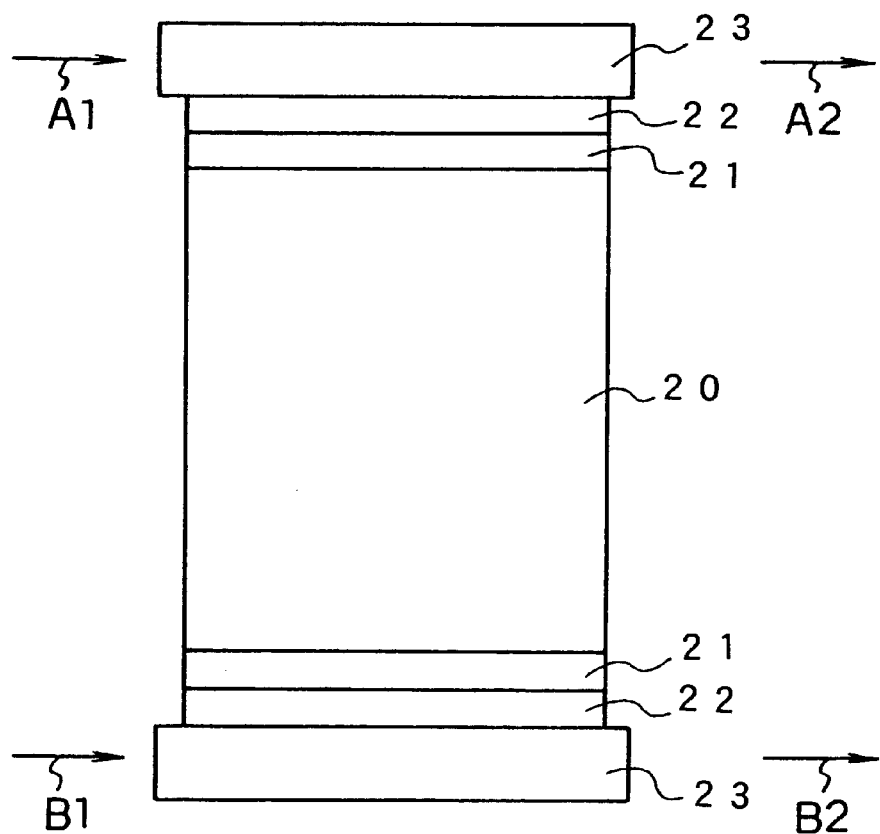
FIG. 6 is a side view schematically illustrating an arrangement of end plates in a fuel cell stack of the present invention.
Figure 7:
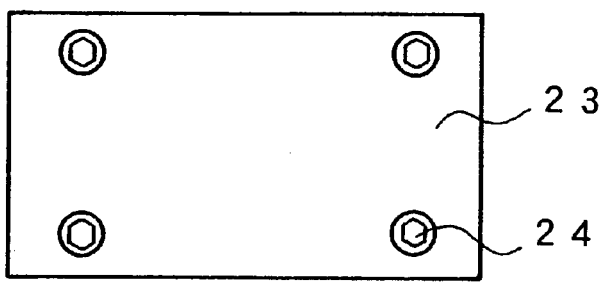
FIG. 7 is a top view schematically illustrating the fuel cell stack shown in FIG. 6.

FIG. 6 is a side view schematically illustrating an arrangement of end plates in a fuel cell stack of the present invention. Referring to FIG. 6, a pair of metal current collectors 21, a pair of insulator plates 22 composed of an electrically insulating material, and a pair of end plates 23 are sequentially disposed outside a cell laminate 20, which is obtained by laying, for example, 50 unit cells one upon another. As shown in FIG. 7, which is a schematic top view of the fuel cell stack of FIG. 6, the end plates 23 are fastened with bolts 24 piercing the cell laminate 20 and nuts to complete one fuel cell stack.

Each end plate 23 has flow paths of the gaseous fuel, the oxidant gas, and the cooling water in the direction perpendicular to the laminating direction of the cell laminate 20. One end plate has the flow paths that run from an A1 side to an A2 side, whereas the other end plate has the flow paths that run from a B1 side to a B2 side. These flow paths are continuous with the inlets and outlets of the gases and the cooling water formed in the separator plates included in the respective unit cells.

In the case where one fuel cell stack shown in FIG. 6 is used alone for power generation, the inlets of the respective gases and the cooling water are disposed on the A1 side and their outlets are disposed on the B2 side, while the A2 side and the B1 side are blocked. This arrangement enables the supplies of the gases and the cooling water to be fed in parallel to the respective unit cells. In the case where a plurality of the unit cell stacks shown in FIG. 6 are joined together, on the other hand, the A1 side and the B1 side of one fuel cell stack are respectively continuous with the A2 side and the B2 side of an adjoining fuel cell stack.

Figure 8:
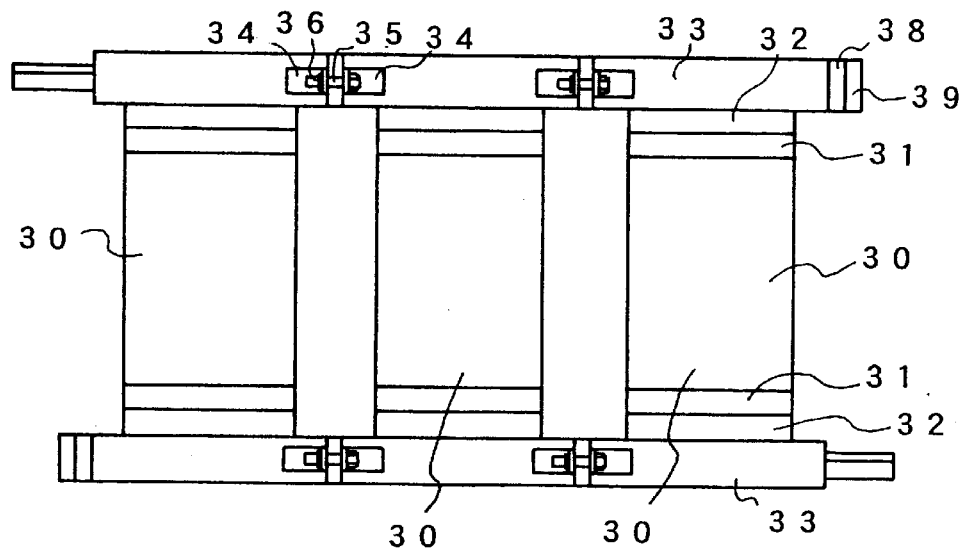
FIG. 8 is a side view schematically illustrating another arrangement of end plates in another fuel cell stack of the present invention.
Figure 9:
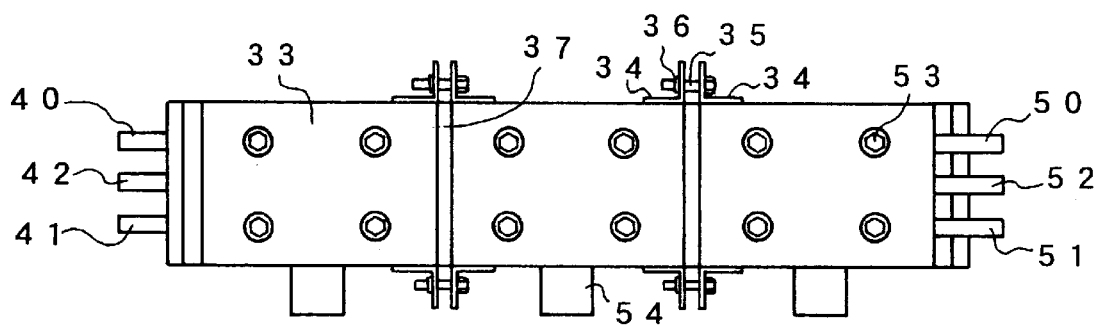
FIG. 9 is a top view schematically illustrating the fuel cell stack shown in FIG. 8.

FIG. 8 is a side view schematically illustrating another arrangement of end plates in another fuel cell stack of the present invention. FIG. 9 is a top view schematically illustrating the fuel cell stack shown in FIG. 8.

Referring to FIG. 8, a pair of current collector 31, a pair of insulator plates 32, and a pair of end plates 33 are sequentially disposed outside a cell laminate 30. As shown in FIG. 9, the end plates 33 are fastened with bolts 53 piercing the cell laminate 30 and nuts to complete one fuel cell stack. Like in the case of FIG. 6, each end plate 33 has flow paths of the gaseous fuel, the oxidant gas, and the cooling water in the direction perpendicular to the laminating direction of the cell laminate 30.

The fuel cell stack shown in FIGS. 8 and 9 includes three cell laminates 30, which are joined together in such a manner that the respective flow paths formed in the end plates 33 are continuous with one another. Joint fixtures 34 are attached to each end plate 33, for example, by welding, and are linked with the joint fixtures 34 of an adjoining end plate 33 with bolts 35 and nuts 36. A sealing member 37 having holes that are continuous with the flow paths of the gaseous fuel, the oxidant gas, and the cooling water is interposed between the adjoining end plates 33, in order to prevent leaks of the gases and the cooling water. Base stands 54 are used to fix the fuel cell stack to a mounting surface.

The fuel cell stack shown in FIGS. 8 and 9 includes three cell laminates joined together. The present invention thus provides a polymer electrolyte fuel cell stack including a plurality of cell laminates, each of which has a plurality of unit cells that are laid one upon another via conductive separators. Each of the unit cells includes a polymer electrolyte membrane, a pair of electrodes that are arranged across the polymer electrolyte membrane and respectively have a catalytic reaction layer, and a unit for feeding a supply of gaseous fuel containing gaseous hydrogen to one of the electrodes and for feeding a supply of oxidant gas containing oxygen to the other of the electrodes. The polymer electrolyte fuel cell further includes a plurality of end plates that are arranged in such a manner that each of the cell laminates is interposed between a pair of end plates. Flow paths of the gaseous fuel, the oxidant gas, and cooling water formed in the plurality of end plates are respectively joined via a fluid sealing mechanism.

In the fuel cell stack shown in FIG. 8, pipes 40, 41, and 42 that are continuous with supply sources of the gases and the cooling water are connected to the flow paths formed in one of the end plates 33 corresponding to the cell laminate located on the left end of the fuel cell stack. Sealing members 38 are pressed against the flow paths formed in the other end plate 33 with side plates 39, so as to block the flow paths. The sealing members 38 are also pressed against the flow paths formed in one of the end plates 33 corresponding to the cell laminate located on the right end of the fuel cell stack with the side plates 39, so as to block the flow paths. Exhaust pipes 50, 51, and 52 of the gases and the cooling water are connected to the flow paths formed in the other end plate 33. This arrangement enables the supplies of the gaseous fuel, the oxidant gas, and the cooling water to be fed in parallel to the unit cells of the respective cell laminates included in the fuel cell stack.

Caulking, rivets, clips, or the like, in place of the bolts and nuts in the above structure, may be used as the fastening means to join the adjacent end plates 33 with each other. As shown in FIG. 8, the non-linked, free side face of the end plate 33 is sealed with the side plates 39 via sealing members, such as O-rings, according to the requirements, in order to prevent the respective fluids from leaking out.

The fuel cell stack of the present invention shown in FIGS. 8 and 9 is an assembly of plural cell laminates having an identical size, which enables cost reduction in mass production. Connecting the adjoining end plates having the flow paths of the gaseous fuel, the oxidant gas, and the cooling water with one another makes the supply means of the respective fluids compact and thereby enables the fuel cell stack to be readily mounted on a variety of equipment.

In the fuel cell stack shown in FIGS. 8 and 9, the plurality of cell laminates are joined with one another by the end plates having the flow paths of the gases and the cooling water. Another possible application may join the plurality of cell laminates with one another via chambers having the flow paths of the gases and the cooling water, in place of the end plates. The present invention is accordingly directed to a polymer electrolyte fuel cell stack that includes a plurality of the cell laminates discussed above, wherein adjoining ones of the cell laminates are linked with each other via a chamber having a plurality of flow paths through which supplies of the gaseous fuel, the oxidant gas, and the cooling water are fed to each of the cell laminates. This arrangement enables the number of joined cell laminates to be freely chosen according to the requirements.

In the embodiment of the present invention discussed above, a predetermined number of unit cells are laminated in parallel to the mounting surface, and a predetermined number of the cell laminates are sequentially joined in the lateral direction. Namely the resulting fuel cell stack has the center of gravity that is closest to the mounting surface. The arrangement of the fuel cell stack having the center of gravity that is closest to the mounting surface ensures the easy space selection when the fuel cell stack is mounted on a variety of equipment. It is also preferable that each unit cell is wide.

The following describes some examples of the present invention with referring to the drawings.

EXAMPLE 1

The process first soaked carbon powder having the particle diameter of not greater than several microns in an aqueous solution of chloroplatinic acid and caused the platinum catalyst to be carried on the surface of the carbon powder by reduction. The weight ratio of carbon to platinum carried thereon was one to one. The process then dispersed the carbon powder with the platinum catalyst carried thereon in an alcohol solution of a polymer electrolyte to yield a slurry.

Figure 10:
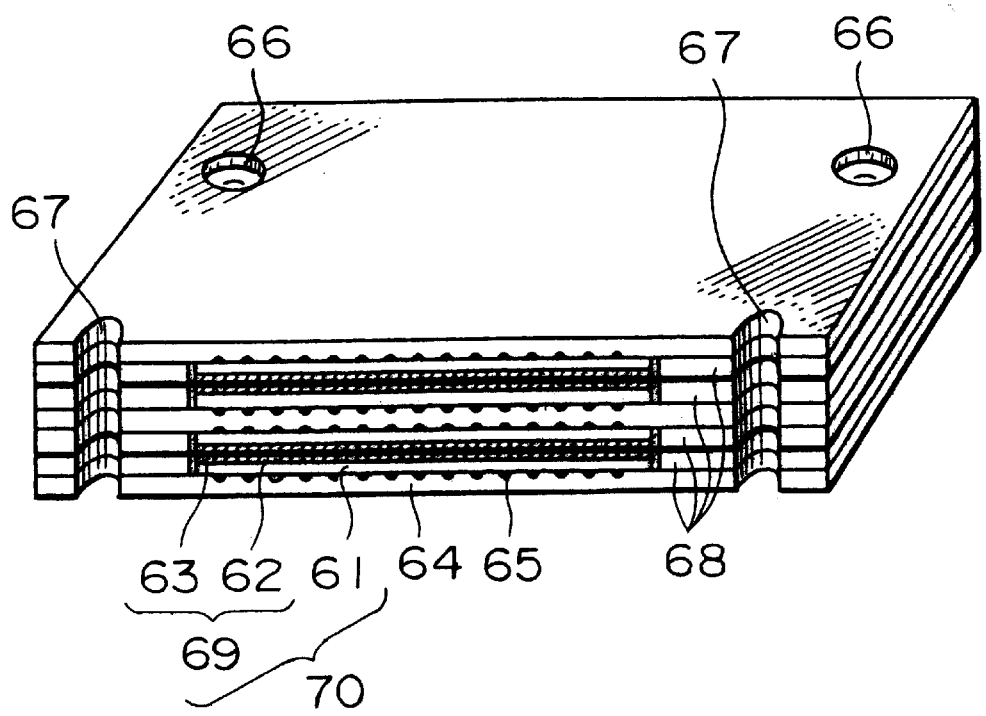
FIG. 10 is a perspective view schematically illustrating a cell laminate including two unit cells.

The process, on the other hand, caused carbon paper having a thickness of 400 µm, which was the material of electrodes, to be impregnated with an aqueous dispersion of a fluororesin (Neoflon ND-1 manufactured by Daikin Industries, Ltd.) The process then dried the impregnated carbon paper and heated at 400° C. for 30 minutes to give the water repellency to the carbon paper. As shown in FIG. 10, the process homogeneously applied the slurry containing the carbon powder on a single face of the water-repelled carbon paper to form a catalytic layer 62 and yield an electrode 69.

The process laid a pair of the resulting electrodes 69 across a polymer electrolyte membrane 63 in such a manner that the respective catalytic layers 62 of the electrodes 69 were in contact with the polymer electrolyte membrane 63, and dried the layered structure to yield an MEA 70. Silicone rubber was used for gaskets that prevented the supplies of gases fed to the fuel cell stack from leaking or from being mixed with each other.

The process then interposed the MEA 70 thus obtained between a pair of carbon separator plates 64 having the air-tightness to assemble a unit cell.

The separator plate 64 is 4 mm in thickness and has a gas flow path 65, which has a width of 2 mm and a depth of 1 mm and has been cut in its surface. The separator plate 64. also has a plurality of gas manifold holes 66 and a plurality of cooling water manifold holes 67 formed on its circumferential part. In the process of interposing the MEA 70 between the pair of separator plates 64, gaskets 68, which had the same outer dimensions as those of the carbon separator plates 64 and were obtained by laying a pair of EPDM sheets across a polyethylene terephthalate (PET) sheet, were disposed around the electrodes 69.

After lamination of two such unit cells, the process disposed a pair of separator plates 64 each having a cooling water flow path, through which the cooling water flows, across the laminated unit cells. This completed a unit cell laminate. In this example, no O rings were used for sealing the cooling water flow path.

Figure 11:
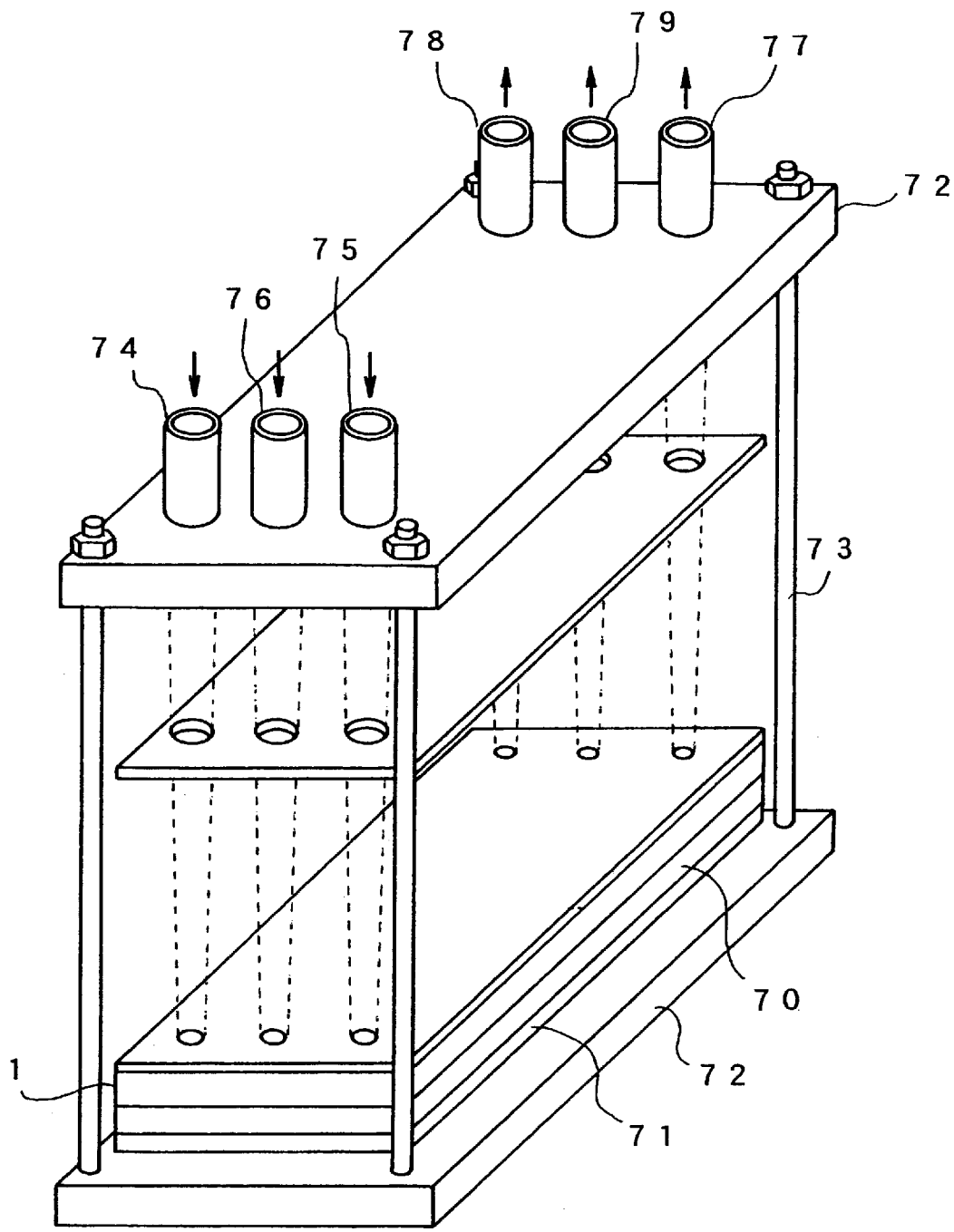
FIG. 11 is a perspective view schematically illustrating a fuel cell stack of the present invention in Example 1.

A fuel cell stack shown in FIG. 11 was assembled by laying a plurality of unit cell laminates, each including two unit cells, one upon another. The process first laid 25 unit cell laminates discussed above (that is, 50 unit cells) one upon another to yield a cell laminate 1, and sequentially disposed a pair of metal current collectors 70, a pair of insulator plates 71 composed of an electrically insulating material, and a pair of end plates 72 across the cell laminate 1. The pair of end plates 72 were linked with each other via tie rods 73 to fix the cell laminate 1 therebetween.

Supplies of the fluids, that is, the gaseous fuel, the oxidant gas, and the cooling water, are respectively fed to the fuel cell stack in the directions of arrows through a gaseous fuel supply conduit 74, an oxidant gas supply conduit 75, and a cooling water supply conduit 76 disposed in the upper end plate 72. These supply conduits 74, 75, and 76 are respectively connected to the corresponding manifold holes of the cell laminate 1. The manifold hole of each fluid has the cross section gradually decreasing towards the downstream of the flow.

The fluids passing through the cell laminate 1 are flown out of the fuel cell stack in the directions of arrows through a gaseous fuel exhaust conduit 77, an oxidant gas exhaust conduit 78, and a cooling water exhaust conduit 79. The manifold holes of the respective fluids connected to the corresponding exhaust conduits 77, 78, and 79 have the cross sections gradually decreasing towards the downstream of their flows.

Each fluid flows into the fuel cell stack from the flow-in manifold, passes through the respective unit cells and the cooling plates, and is discharged from the flow-out manifold, which is arranged on the same end plate with the flow-in manifold, to the outside of the fuel cell stack.

This arrangement ensures the variable flow length of each fluid passing through each unit cell. Balancing the pressure gradient occurring in each fluid due to the dynamic pressure with the pressure loss occurring in each fluid due to the variation in flow length enables each fluid to be homogeneously supplied to each unit cell. The decrease in cross section of the manifold regulates the pressure gradient due to the dynamic pressure, thereby enabling reduction of the outer dimensions. This attains a light-weighted. compact fuel cell stack.

EXAMPLE 2

A fuel cell stack shown in FIG. 4 was assembled using a cell laminate 1, which was obtained by laying 50 unit cell laminates each including two unit cells and being identical with that prepared in Example 1, one upon another.

The process sequentially disposed a pair of metal current collectors 6, a pair of insulator plates 7, and a pair of end plates 5 across the cell laminate 1. The pair of end plates 5 had recesses on their side parts. The cell laminate 1 was fixed with fastening belts 9b fitted in the recesses. Each of the insulator plates 7 and each of the end plates 5 had through holes (not shown), in which a collecting member 8 is fitted. The end of each collecting member 8 is electrically connected to the current collector 6 and functions as an output terminal. The collecting member 8 is Insulated from the end plate 5 by an electrically insulating material. The electrically insulating material for insulating the end plate 5 from the collecting member 8 may be integrated with the insulator plate 7 to exert the same effects.

This arrangement effectively prevents any connecting members for connecting the cell laminate with equipment from being protruded from the contour of the cell laminate. The arrangement attains a compact fuel cell stack and thereby improves the degree of freedom-when the fuel cell stack is mounted on a variety of equipment.

COMPARATIVE EXAMPLE 1 AND EXAMPLE 3

The process first soaked carbon powder having the particle diameter of not greater than several microns in an aqueous solution of chloroplatinic acid and caused the platinum catalyst to be carried on the surface of the carbon powder by reduction. The weight ratio of carbon to platinum carried thereon was one to one. The process then dispersed the carbon powder with the platinum catalyst carried thereon in an alcohol solution of a polymer electrolyte to yield a slurry.

The process, on the other hand, caused carbon paper having a thickness of 400 µm, which was the material of electrodes, to be impregnated with an aqueous dispersion of a fluororesin (Neoflon ND-1 manufactured by Daikin Industries, Ltd.) The process then dried the impregnated carbon paper and heated at 400° C. for 30 minutes to give the water repellency to the carbon paper. The process homogeneously applied the slurry containing the carbon powder on a single face of the water-repelled carbon paper to form a catalytic layer 62 and yield an electrode 69.

A unit cell laminate including two unit cells shown in FIG. 10 was assembled using the electrodes 69 thus obtained.

The process cut the resulting electrode 69 to a piece having both a length and a width of 10 cm, and laid a pair of such electrodes 69 across a polymer electrolyte membrane 63 having both a length and a width of 12 cm, in such a manner that the respective catalytic layers 62 of the electrodes 69 were in contact with the polymer electrolyte membrane 63 and were located on the center of the polymer electrolyte membrane 63. A pair of silicone rubber sheets having a thickness of approximately 350 µm were arranged around the electrodes 69 and across the polymer electrolyte membrane 63. The layered structure was hot pressed at 100° C. for 5 minutes to give an MEA 70. The silicone rubber was used for gaskets that prevented the supplies of gases fed to the fuel cell stack from leaking or from being mixed with each other.

A pair of MEAs 70 thus obtained and separator plates 64 were laid alternately. Each separator plate 64 is a carbon sheet having a thickness of 4 mm and has air tightness. The separator plate 64 has a gas flow path 65, which has a width of 2 mm and a depth of 1 mm and has been cut in its surface that is in contact with the MEA 70. The separator plate 64 also has a plurality of gas manifold through holes 66 for the gaseous fuel or the oxidant gas formed on its circumferential part. The manifold through holes 66 are continuous with the ends of the gas flow path 65. In a similar manner, a plurality of manifold holes 67 for circulating the cooling water were also formed through the separator plate 64.

In the process of interposing the MEA 70 between the pair of separator plates 64, polyethylene terephthalate (PET) sheets 68, which had the same outer dimensions as those of the carbon separator plates 64, were disposed around the electrodes 69. The PET sheet 68 was used as a spacer between the separator plate 64 and the polymer electrolyte membrane 63 of the MEA 70. No O rings were used for sealing the cooling water flow paths.

The process laid 25 such unit cell laminates, that is, 50 unit cells, one upon another to yield a cell laminate 1, and sequentially disposed a pair of metal connectors, a pair of insulator plates, and a pair of end plates across the cell laminate 1. The pair of end plates were connected to each other via tie rods to fix the cell laminate 1 therebetween. This gave a comparative fuel cell stack (Comparative Example 1). The fastening pressure was 10 kgf/cm$^2$ with respect to the area of the separator plate. The gaseous fuel and the cooling water were flown into this comparative fuel cell stack including 50 unit cells. The flows of the gaseous fuel and the cooling water leaked from the clearance between the PET sheet and the separator, so that the sufficient cell performance could not be attained.

The fuel cell stack of Example 3 adopted, in place of the internal manifold arrangement, the external manifold arrangement in which the manifolds were disposed in parallel along the longitudinal direction of the cell laminate, that is, along the length of the cell laminate. FIG. 12 is a perspective view schematically illustrating the fuel cell stack obtained in Example 3.

Figure 13:
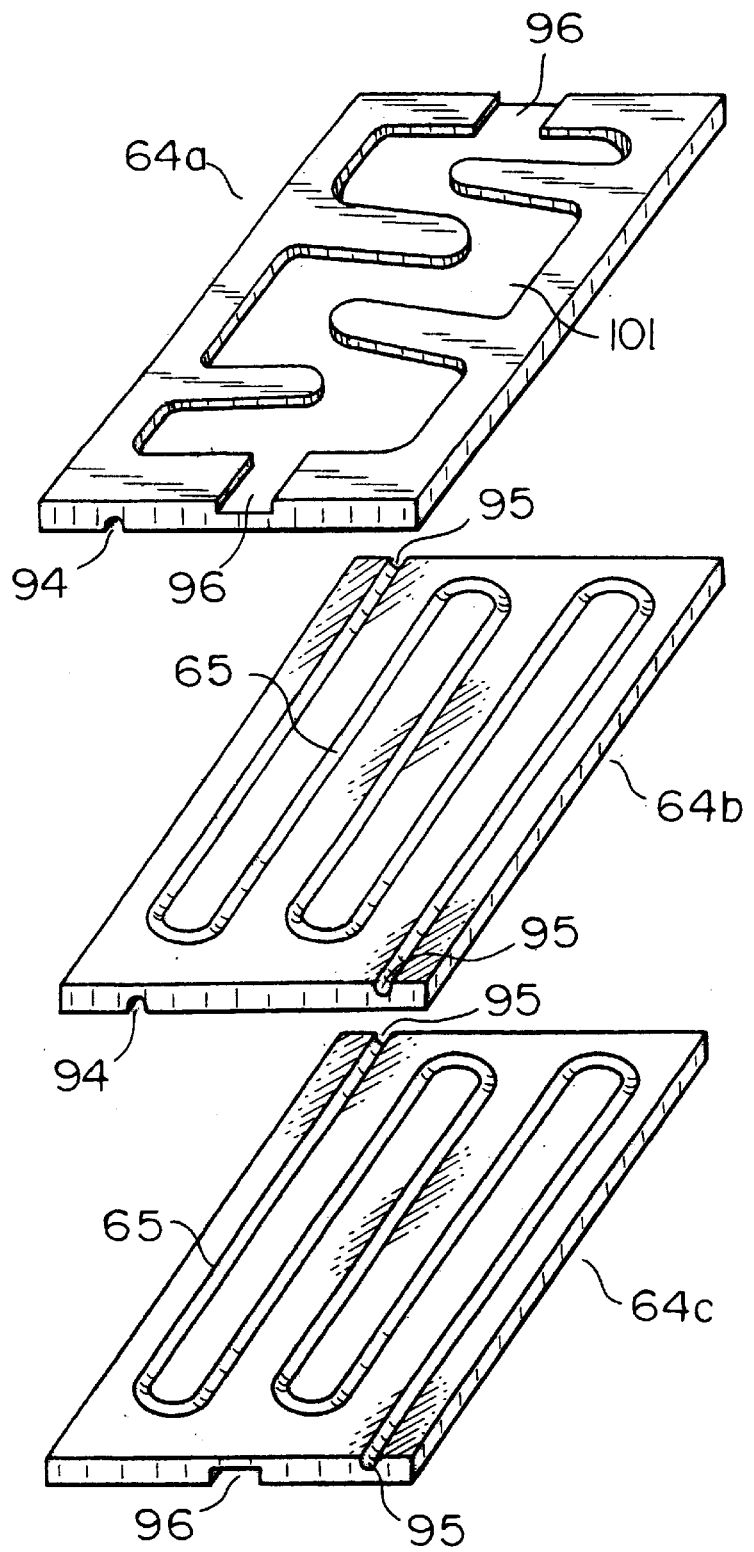
FIG. 13 is a perspective view schematically illustrating separator plates used in Example 3.

The process interposed the MEA 70 prepared in the above manner between separator plates 64a and 64b shown in FIG. 13 and between separator plates 64b and 64c, so as to yield a unit cell laminate. The separator plates 64a, 64b, and 64c are carbon sheets of 4 mm in thickness and have air tightness. Either a gas flow path 65 or a cooling water flow path 101 is formed on each surface of these separator plates 64a, 64b, and 64c.

Referring to FIG. 13, the cooling water flow path 101 is formed in the upper surface of the separator plate 64a and the lower surface of the separator plate 64c. Openings 96 of the cooling water flow path 101 are open to the side faces of the separator plates 64a and 64c. A gas flow path 65 for making either a flow of the gaseous fuel or a flow of the oxidant gas is formed in the lower surface of the separator plate 64a, both surfaces of the separator plate 64b, and the upper surface of the separator plate 64c. The gas flow path 65 has been cut in the corresponding surfaces and has a width of 2 mm and a depth of 1 mm. Like the openings 96 of the cooling water flow path 101, openings 94 and 95 of the gas flow paths 65 of the gaseous fuel and the oxidant gas are also open to the side faces of the respective separator plates 64a, 64b, and 64c. The separator plates 64a through 64c do not have any manifold holes unlike the internal manifold arrangement, but have only the gas flow path 65 or the cooling water flow path 101 arranged over the whole surface thereof. The inlet and the outlet, that is, a pair of openings 94 or 95, of the gas flow path 65 are arranged on the opposite sides. The openings 94 of the gaseous hydrogen, the openings 95 of the air, and the openings 96 of the cooling water are arranged in such a manner that the external manifolds are located on the opposite side faces when the unit cells are laid one upon another.

Example 3 did not use any PET sheets but applied the carbon sheets with the catalytic reaction layer 62, which had identical outer dimensions with those of the carbon separators. In this Example 3, the unit cells were laid one upon another in such a manner that the ends of the respective electrodes reached the side faces of the unit cell. The process alternately laid a unit cell laminate including two unit cells and a cooling plate and assembled a cell laminate including 50 unit cells. No O rings were used for sealing the cooling plates. Since the external manifold arrangement was adopted, there was no need of forming the inlets and the outlets of the fluids in the current collectors, the insulator plates, and the end plates. Tie rods for fastening the cell laminate were located on side faces that were different from the side faces with the openings of the gas flow path 65.

The side faces of the cell laminate were covered with a phenol resin used as the sealing material. Here the openings 94 and 95 of the gases and the openings 96 of the cooling water were not blocked with the sealing material. In order to make the surface as smooth as possible, special care was given to application of the phenol resin to a specific part that was in contact with the sealing surface of the external manifold.

As shown in FIG. 12, semi-cylindrical SUS external manifolds 87 were arranged along the longitudinal sides of the cell laminate 1 to cover the respective arrays of the openings 94 of the gaseous fuel, the openings 95 of the oxidant gas, and the openings 96 of the cooling water. The external manifolds 87 were fixed to the cell laminate 1 with end plate screws 88. A manifold seal 89 between the external manifold 87 and the sealing material covering over the side surface of the cell laminate was obtained by cutting an EPDM sheet containing closed bubbles into a predetermined shape corresponding to the sealing surface of the external manifold.

A battery test was carried out while the gaseous hydrogen and the air were flown into and the cooling water was circulated through the cell laminate including 50 unit cells. The observed cell output was 1020 W (30 A–35 V) under the conditions of the hydrogen utilization rate of 70%, the oxygen utilization rate of 20%, the humidified hydrogen bubbler temperature of 85° C., the humidified oxygen bubbler temperature of 75° C., and the cell temperature of 75° C. The gas leaks from the seals of the external manifolds were also measured. No leaks were, however, detected. This proves the favorable sealing properties.

This example covers the whole side faces of the fuel cell stack with the sealing material and accordingly facilitates the external manifold arrangement, which is conventionally adopted in fuel cell stacks of the molten carbonate type.

The arrangement of this example enables the manifolds and the cell laminate to be manufactured separately. The arrangement thus ensures the standard mass production of unit cell laminates consisting of the separators and MEAs of an identical contour, regardless of the application and the output level of the fuel cell stack. Manufacture of the manifolds according to the application and the output level of the fuel cell stack effectively reduces the required cost.

EXAMPLE 4

Example 4 disposed a connection manifold 12 on the periphery of the cell laminate 1, in addition to the inlet manifold 10 and the outlet manifold 11, which function like the manifolds of Example 3, As shown in FIG. 5. This arrangement securely fastens the unit cells included in the cell laminate 1 and thereby reduces the contact resistance between the adjoining unit cells. The fuel cell stack of Example 4 has the same configuration as that of the fuel cell stack of Example 3, except the arrangement of the gas manifolds.

The fuel cell stack of the above configuration was evaluated under the same conditions as those of Example 3. The observed output of the fuel cell stack was 1200 W (30 A–40 V). This shows that the fuel cell stack of Example 4 has the better performance than those of the fuel cell stack of Example 3 and the fuel cell stack with spacers, such as the PET sheet. This may be ascribed to the fact that the arrangement of the manifolds on the periphery of the cell laminate effectively fastens the unit cells and thereby reduces the contact resistance between the adjoining unit cells.

EXAMPLE 5

Example 5 evaluated the effects of the manifolds in the fuel cell stack having the configuration discussed in Example 4, on the stability of the cell output properties while the environment was changed.

Example 5 changed the attachment areas of the inlet manifold 10, the outlet manifold, and the connection manifold 12 shown in FIG. 5 in the fuel cell stack of Example 4. Example 5 also changed the material of the manifolds and evaluated the relationship between the thermal conductivity of the manifold and the stability of the cell output. The results of the evaluation are shown in the graph of FIG. 14.

Figure 14:
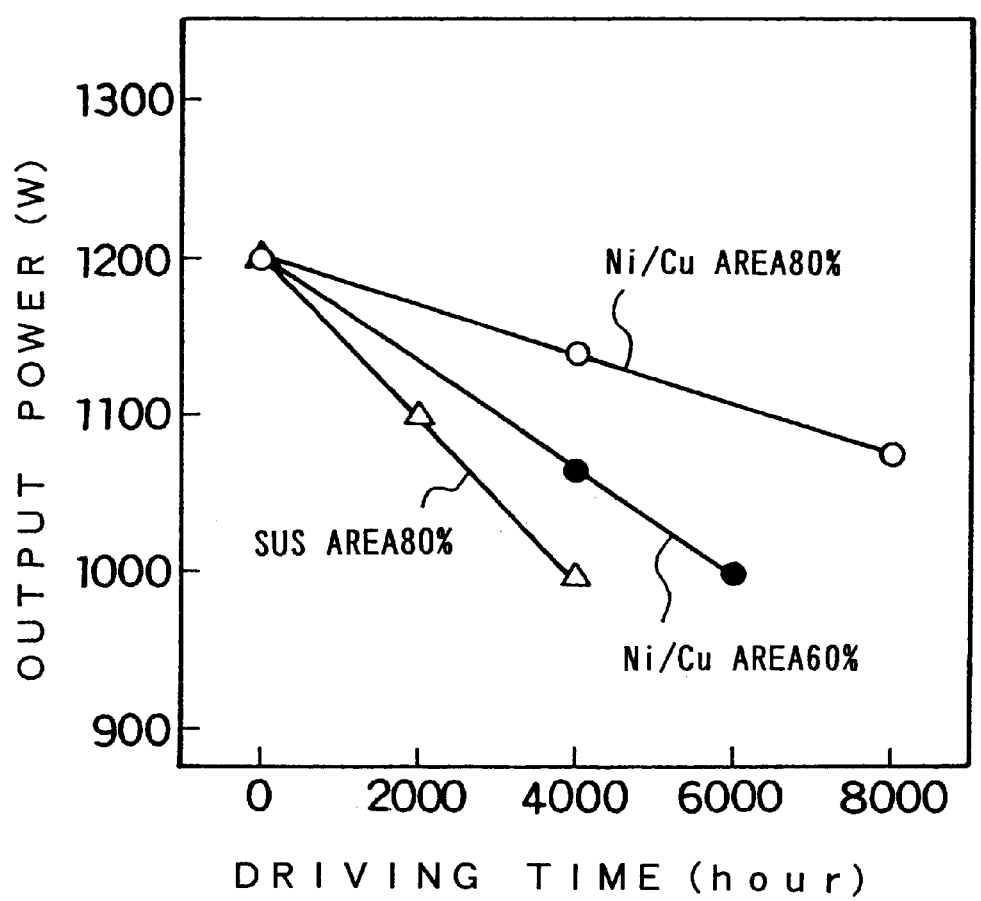
FIG. 14 is a graph showing the relationship between the thermal conductivity of the manifold and the stability of cell output with regard to a fuel cell stack in Example 5.
Figure 15:
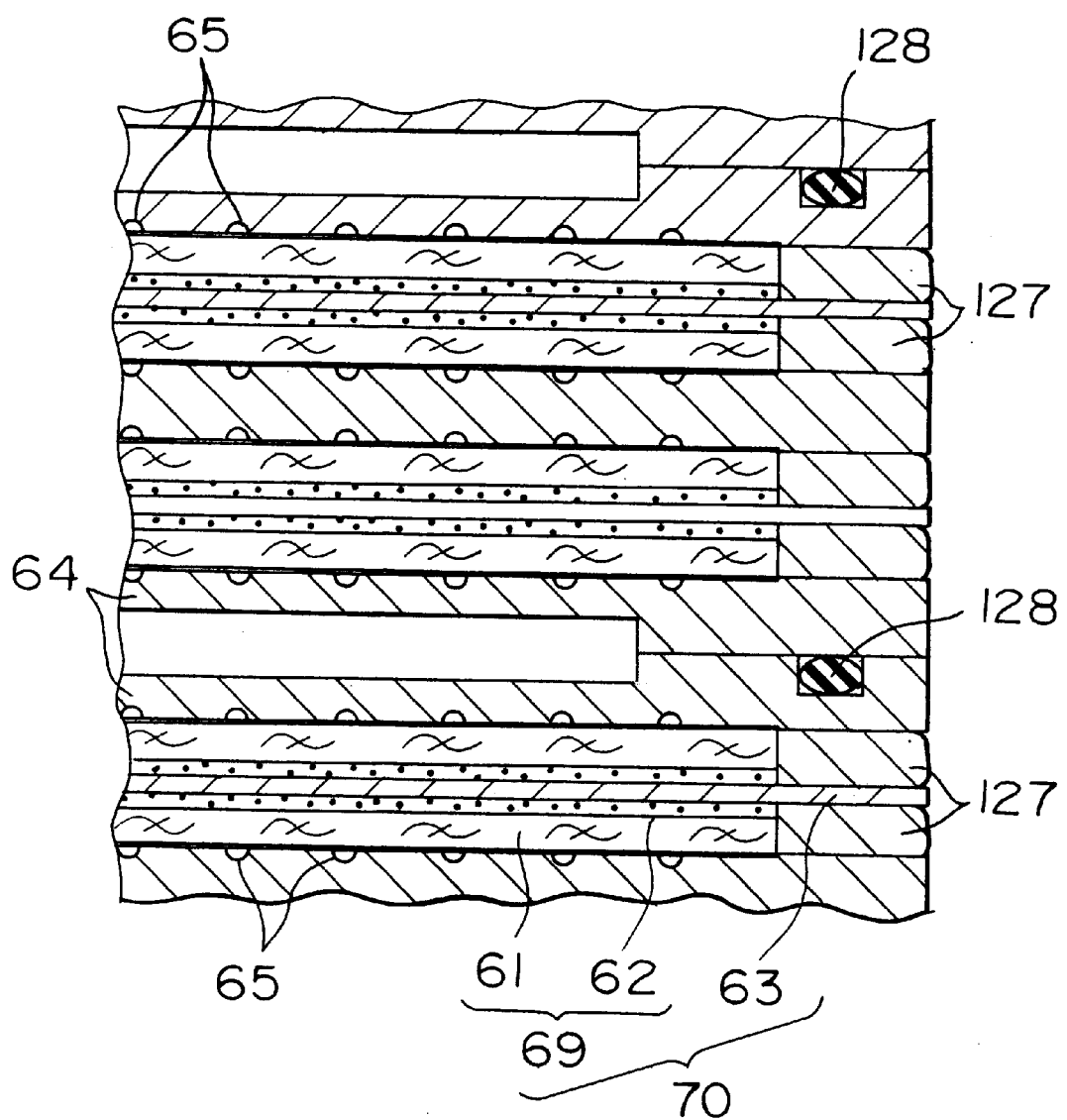
FIG. 15 is a partial vertical sectional view schematically illustrating a cell laminate for the purpose of description of a prior art sealing method.
Figure 16:
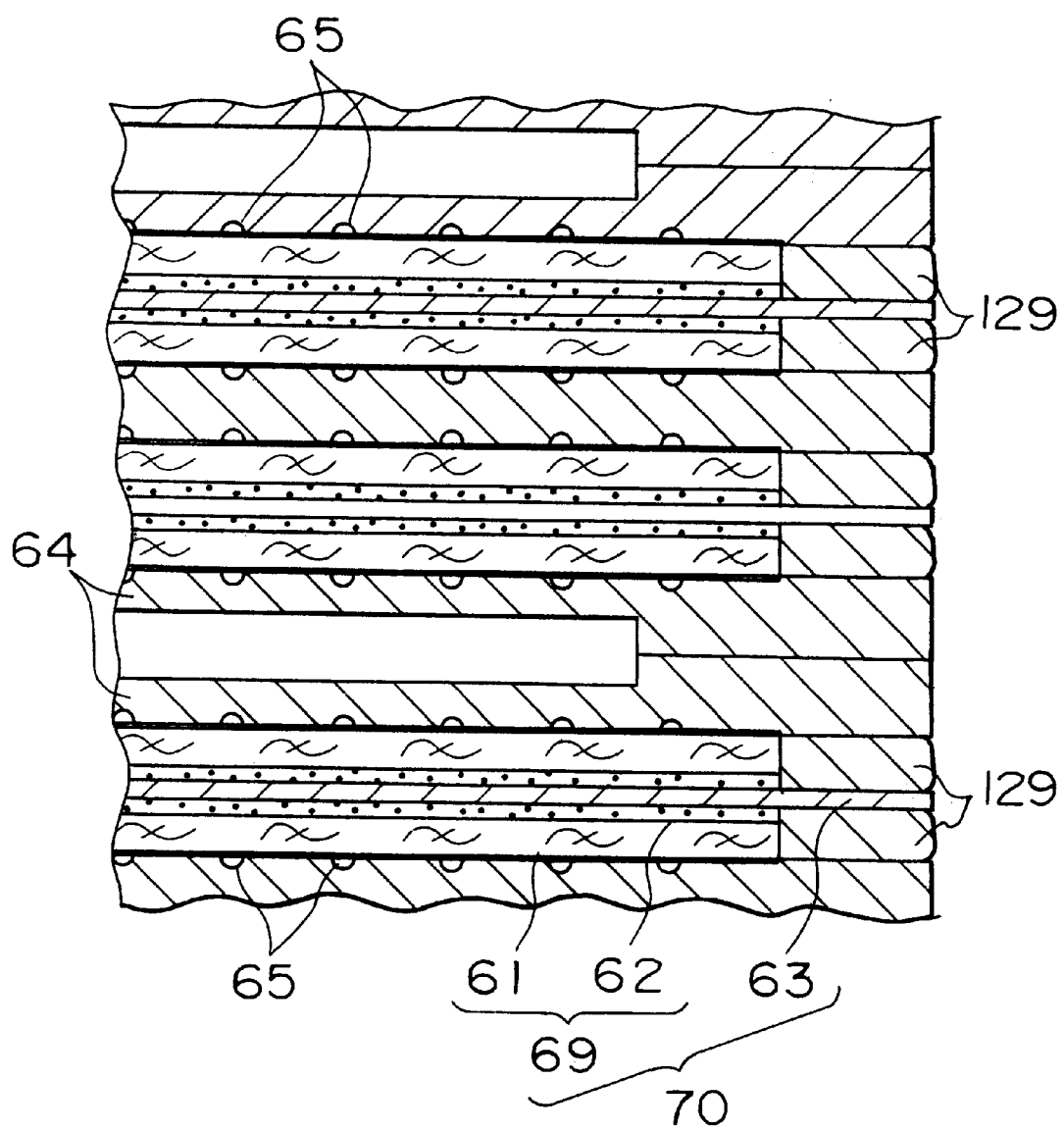
FIG. 16 is a partial vertical sectional view schematically illustrating another cell laminate for the purpose of description of another prior art sealing method.
Figure 17:
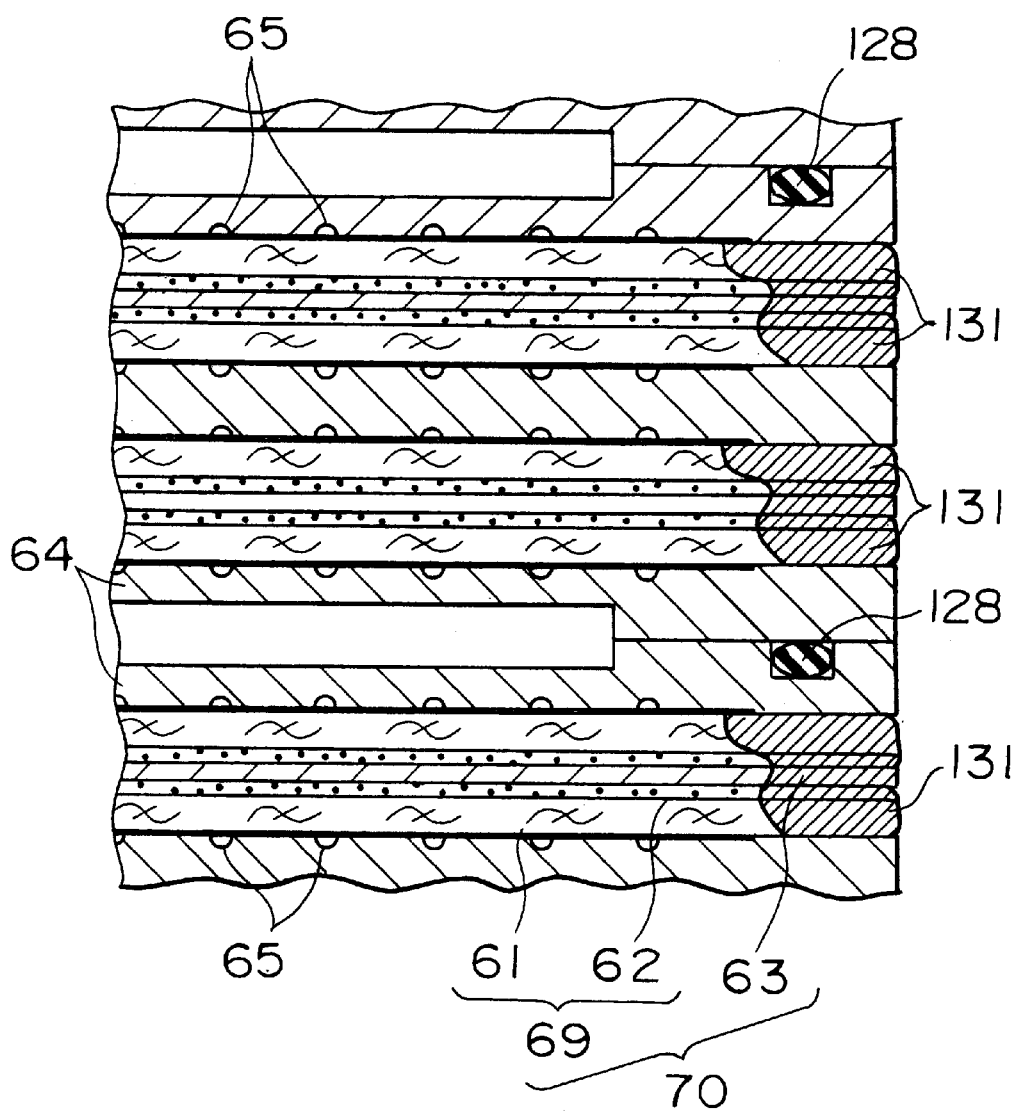
FIG. 17 is a partial vertical sectional view schematically illustrating still another cell laminate for the purpose of description of still another prior art sealing method.

The graph of FIG. 14 shows the power output of the cell module as ordinate and the driving time as abscissa. The area here means the area percent of the manifold relative to the side area (100) of the cell laminate to which the manifold is attached. The symbol 'SUS' in the graph shows the result when the manifold is made of SUS like Example 4, and the symbol 'Ni/Cu' shows the result when the manifold is made of copper plated with nickel.

For the evaluation of the cell performance, the battery test was carried out while the gaseous hydrogen and the air were flown into and the cooling water was circulated through the fuel cell stack. The conditions of the test were the hydrogen utilization rate of 70%, the oxygen utilization rate of 20%, the humidified hydrogen bubbler temperature of 85° C., and the humidified oxygen bubbler temperature of 75° C. The applied environment cycle exposed the fuel cell stack to a 5° C. atmosphere for 12 hours and subsequently to a 40° C. atmosphere for 12 hours. The temperature of the cooling water was changed synchronously with the temperature of the atmosphere: at 5° C. for 12 hours and at 25° C. for 12 hours.

In the test with the varying environmental temperature of the fuel cell stack, the long-term stability was improved with an increase in area of the manifold. The copper manifold plated with nickel having the excellent thermal conductivity showed the better performance than that of the SUS manifold. This is ascribed to the heat dissipation of the manifold when the atmosphere has a relatively high temperature.

EXAMPLE 6

The process first soaked carbon powder having the particle diameter of not greater than several microns in an aqueous solution of chloroplatinic acid and caused the platinum catalyst to be carried on the surface of the carbon powder by reduction. The weight ratio of carbon to platinum carried thereon was one to one. The process then dispersed the carbon powder with the platinum catalyst carried thereon in an alcohol solution of a polymer electrolyte to yield a slurry. The process, on the other hand, caused carbon paper having a thickness of 400 $\mu$m, which was the material of electrodes, to be impregnated with an aqueous dispersion of a fluororesin (Neoflon ND-1 manufactured by Daikin Industries, Ltd.) The process then dried the impregnated carbon paper and heated at 400° C. for 30 minutes to give the water repellency to the carbon paper and yield a carbon paper electrode 61.

Referring to FIG. 10, the process homogeneously applied the slurry containing the carbon powder on a single face of the water-repelled carbon paper electrode 61 to form a catalytic layer 62. The process laid a pair of the carbon paper electrodes 61 across a polymer electrolyte membrane 63 in such a manner that the respective catalytic layers 62 of the carbon paper electrodes 61 were in contact with the polymer electrolyte membrane 63, and dried the layered structure to yield an MEA. The MEA was interposed between a pair of carbon separator plates 64 having air tightness to yield a unit cell.

The separator plate 64 is 4 mm in thickness and has a gas flow path 65, which has a width of 2 mm and a depth of 1 mm and has been cut in its surface. The separator plate 64 also has a plurality of gas manifold holes 66 and a plurality of cooling water manifold holes 67 formed on its circumferential part. In the process of interposing the MEA between the pair of separator plates 64, gaskets 68, which had the same outer dimensions as those of the carbon separator plates 64 and were obtained by laying a pair of ethylene-propylene-diene terpolymer mixture (EPDM) sheets across a polyethylene terephthalate (PET) sheet, were disposed around the electrodes 61.

After lamination of two such unit cells, the process disposed a pair of separator plates 64 each having a cooling water flow path, through which the cooling water flows, across the laminated unit cells. Repetition of this pattern completed a cell laminate. In this example, no O ring for sealing was used between the separator plates having the cooling water flow path. The fuel cell stack having the configuration shown in FIGS. 6 and 7 was assembled by laying 50 unit cell laminates, each including two unit cells.

When the fuel cell stack manufactured as discussed above is mounted, for example, on a vehicle, it is required to minimize the damage on the fuel cell stack and ensure the safety in the case of a collision of the vehicle. It is thus desirable that the fuel cell stack is installed under the floor of the vehicle on which the driver and passengers ride. In order to ensure a sufficient space for passengers, the fuel cell stack mounted on the vehicle should be thin in the direction of the height. The arrangement of this example locates the center of gravity of the fuel cell stack closest to the mounting surface of the fuel cell stack, thereby minimizing the height of the fuel cell stack from the mounting surface.

What is claimed is:

1. A polymer electrolyte fuel cell stack comprising a cell laminate, said cell laminate comprising a plurality of unit cells that are laid one upon another via conductive separators, each of said unit cells comprising a polymer electrolyte membrane, a pair of electrodes that are arranged across said polymer electrolyte membrane and respectively have a catalytic reaction layer, and a unit for feeding a supply of gaseous fuel containing gaseous hydrogen to one of said electrodes and for feeding a supply of oxidant gas containing oxygen to the other of said electrodes, wherein said polymer electrolyte fuel cell stack further comprises:

an inlet manifold that distributes supplies of the gaseous fuel, the oxidant gas, and cooling water through the cell laminate in a first direction from a unit cell on one end of said cell laminate to a unit cell on the other end of said cell laminate; and an outlet manifold that discharges exhausts of the gaseous fuel, the oxidant gas, and the cooling water through the cell laminate in a direction opposite to the first direction from the unit cell on the other end of said cell laminate to the unit cell on the one end of said cell laminate.

2. A polymer electrolyte fuel cell stack in accordance with claim 1, wherein said polymer electrolyte fuel cell stack further comprises:

a pair of end plates that are disposed on opposite sides of said cell laminate to apply a compressive force to the respective unit cells of said cell laminate in a laminating direction;

a pair of current collectors that collect electricity of the respective unit cells, each of said current collectors having a specific part that pierces said end plate; and a pair of insulating members, each of said insulating members being interposed between said current collector and said end plate.

3. A polymer electrolyte fuel cell stack in accordance with claim 1, wherein said inlet manifold has a cross section gradually decreasing towards a downstream thereof, and said outlet manifold has a cross section gradually increasing towards a downstream thereof.

4. A polymer electrolyte fuel cell stack in accordance with claim 1, wherein said inlet manifold and said outlet manifold are respectively arranged on side faces of said cell laminate and in parallel to a laminating direction of the respective unit cells.

5. A polymer electrolyte fuel cell stack in accordance with claim 1. wherein said Inlet manifold and said outlet manifold are arranged around a periphery of said cell laminate, so as to bind the respective unit cells and reduce a contact resistance between adjoining unit cells.

6. A polymer electrolyte fuel cell stack in accordance with claim 3, wherein flow paths of the gaseous fuel, the oxidant gas, and the cooling water are disposed in each of said end plates in a direction perpendicular to a laminating direction of the respective unit cells.

7. A polymer electrolyte fuel cell stack comprising a plurality of cell laminates, each of said cell laminates comprising a plurality of unit cells that are laid one upon another via conductive separators, each of said unit cells comprising a polymer electrolyte membrane, a pair of electrodes that are arranged across said polymer electrolyte membrane and respectively have a catalytic reaction layer, and a unit for feeding a supply of gaseous fuel containing gaseous hydrogen to one of said electrodes and for feeding a supply of oxidant gas containing oxygen to the other of said electrodes, wherein said polymer electrolyte fuel cell stack further comprises a plurality of end plates that are arranged in such a manner that each of said cell laminates is interposed between a pair of end plates, flow paths of the gaseous fuel, the oxidant gas, and cooling water formed in said plurality of end plates being respectively connected via a fluid sealing mechanism.

8. A polymer electrolyte fuel cell stack in accordance with claim 7, wherein said cell laminates are connected with each other via a chamber having a plurality of flow paths through which supplies of the gaseous fuel, the oxidant gas, and the cooling water are fed to each of said cell laminates.

* * * * *